(12) United States Patent
Menz et al.

(10) Patent No.: US 8,263,292 B2
(45) Date of Patent: Sep. 11, 2012

(54) METHOD FOR PRODUCING COUNTERFEIT-PROOF CONFIDENTIAL AND VALUABLE DOCUMENTS

(75) Inventors: Irina Menz, Grasbrunn (DE); Guenther Dausmann, Grasbrunn (DE)

(73) Assignee: Hologram Industries Research GmbH, Pliening-Ottersberg (DE)

( * ) Notice: Subject to any disclaimer, the term of this patent is extended or adjusted under 35 U.S.C. 154(b) by 215 days.

(21) Appl. No.: 12/589,454

(22) Filed: Oct. 23, 2009

(65) Prior Publication Data

US 2010/0202028 A1   Aug. 12, 2010

Related U.S. Application Data

(63) Continuation of application No. PCT/DE2008/000261, filed on Feb. 13, 2008.

(30) Foreign Application Priority Data

Apr. 25, 2007 (DE) .......................... 10 2007 019 837

(51) Int. Cl.
  *G03H 1/02* (2006.01)
(52) U.S. Cl. ...................... 430/1; 430/2; 359/12; 359/3
(58) Field of Classification Search .................. None
  See application file for complete search history.

(56) References Cited

U.S. PATENT DOCUMENTS

| | | | |
|---|---|---|---|
| 3,658,526 A | 4/1972 | Haugh | |
| 3,758,186 A | 9/1973 | Brumm | |
| 4,761,543 A | 8/1988 | Hayden | |
| 4,856,857 A * | 8/1989 | Takeuchi et al. | 359/3 |
| 4,913,990 A | 4/1990 | Rallison | |
| 5,083,850 A * | 1/1992 | Mallik et al. | 359/1 |
| 5,128,779 A * | 7/1992 | Mallik | 359/2 |
| 5,182,180 A * | 1/1993 | Gambogi et al. | 430/1 |
| 5,499,118 A | 3/1996 | Wreede et al. | |
| 5,640,255 A * | 6/1997 | Haines | 359/2 |
| 5,856,048 A | 1/1999 | Tahara et al. | |
| 6,097,514 A | 8/2000 | Nishikawa | |
| 6,687,031 B1 * | 2/2004 | Kodama et al. | 359/22 |

(Continued)

FOREIGN PATENT DOCUMENTS

CA   2 244 018   2/1999

(Continued)

OTHER PUBLICATIONS

International Search Report of PCT/DE2008/000261.
International Search Report of PCT/DE2008/000262, Aug. 11, 2008.

*Primary Examiner* — Martin Angebranndt
(74) *Attorney, Agent, or Firm* — Collard & Roe, P.C.

(57) ABSTRACT

A production method is provided by which a copied volume hologram from a multi-layer master is later customized by utilization of the color tuning properties of the light-curable materials used for the application onto personal documents. These holographic individual data, such as a passport photo, are also separately detectable, without the holographic elements copied from the master, that are visible under other viewing angles, impairing the visibility of the individual data. The volume hologram overlay obtained by this method is applied on personal and valuable documents to increase protection against forgery, possesses superimposed optically variable items of information that are separately visible under different viewing angles and give a defined color change under different view angles, wherein at least one of these items of optical information represents individual personal data, in particular a passport photograph.

12 Claims, 2 Drawing Sheets

U.S. PATENT DOCUMENTS

| | | | |
|---|---|---|---|
| 2002/0118409 A1 | 8/2002 | Stevenson | |
| 2002/0191234 A1* | 12/2002 | Ishimoto et al. | 359/1 |
| 2003/0016408 A1* | 1/2003 | Kashiwagi et al. | 359/2 |
| 2003/0230816 A1 | 12/2003 | Kappe et al. | |
| 2004/0100707 A1* | 5/2004 | Kay et al. | 359/883 |
| 2004/0121241 A1* | 6/2004 | Kodama | 430/1 |
| 2005/0012326 A1* | 1/2005 | Keller et al. | 283/94 |
| 2005/0170259 A1* | 8/2005 | Holmes | 430/1 |
| 2006/0072178 A1* | 4/2006 | Takabayashi et al. | 359/24 |
| 2006/0121358 A1 | 6/2006 | Rich et al. | |
| 2007/0064290 A1 | 3/2007 | Hochenbleicher et al. | |
| 2007/0171491 A1* | 7/2007 | Millington | 359/2 |
| 2007/0195391 A1* | 8/2007 | Nishikawa et al. | 359/15 |
| 2009/0162756 A1* | 6/2009 | Staub et al. | 430/2 |
| 2009/0262407 A1* | 10/2009 | Dausmann et al. | 359/27 |
| 2011/0049864 A1* | 3/2011 | Menz et al. | 283/86 |
| 2011/0212387 A1* | 9/2011 | Hansen et al. | 430/2 |

FOREIGN PATENT DOCUMENTS

| | | |
|---|---|---|
| CA | 2 247 974 | 9/2007 |
| DE | 198 09 502 | 2/1999 |
| DE | 198 09 503 | 2/1999 |
| DE | 198 02 586 | 6/1999 |
| DE | 100 55 429 | 5/2002 |
| DE | 100 36 505 | 8/2003 |
| DE | 602 01 579 | 1/2006 |
| DE | 10 2005 029 853 | 1/2007 |
| EP | 0 701 183 | 3/1996 |
| EP | 0 896 260 | 2/1999 |
| EP | 0 919 961 | 6/1999 |
| JP | 2005-331758 | 12/2005 |
| JP | 2006-349874 | 12/2006 |
| WO | WO 95/13568 | 5/1995 |
| WO | WO 02/25326 | 3/2002 |
| WO | WO 02/070275 | 9/2002 |

* cited by examiner

METHOD FOR PRODUCING COUNTERFEIT-PROOF CONFIDENTIAL AND VALUABLE DOCUMENTS

CROSS REFERENCE TO RELATED APPLICATIONS

Applicants claim priority under 35 U.S.C. §119 of German Application No. 10 2007 019 837.1 filed on Apr. 25, 2007. Applicants also claim priority under 35 U.S.C. §120 of International Application No. PCT/DE2008/000261 filed Feb. 13, 2008. This application is a by-pass continuation application of said International Application No. PCT/DE2008/000261 filed Feb. 13, 2008. The International Application under PCT Article 21(2) was not published in English. The disclosure of the aforesaid International Application and German Application are incorporated by reference.

The invention relates to a method for producing counterfeit-proof confidential and valuable documents, a master to be used in this method, and a confidential and valuable document produced by means of this method, in accordance with the preamble of Claims 1, 3, and 12.

It is known that volume hologram overlays with individualised personal data are used for the protection of personal documents against forgery (EP 0896260 A2). The personal data, such as for example a photograph of the document owner, are in this case arranged separately next to other visual information, such as for example a three-dimensional object and other holographic optical elements that are difficult to imitate. The pieces of information arranged next to one another are not optimally linked together, in order to prevent unauthorised copying of individual holographic elements and manipulation of the personal data.

In EP 0701 183 A2, a multi-layer master is described, onto which a holographic recording material is laminated. The copy is made by means of at least two laser beams, which strike the master at different angles, are incoherent relative to each other or have different polarisation directions, so that all information can be reconstructed without errors. The laser beams can also have different wavelengths. The master here consists of multiple volume hologram layers with differently aligned Bragg planes (reflection volume holograms and/or transmission volume holograms).

Therefore, it is known that overlapping, differently coloured, holographic standard information items can be copied from a master by means of multiple laser beams of different wavelength. For a continuous mass production of such holograms by contact copying however, for example using a master drum replicator, a complicated procedure for continuously and dynamically changing the deflection of the laser beams would be necessary, as would a means of regulating them in a tuned manner.

U.S. Pat. No. 5,856,048 concerns holograms for the forgery protection of cards, etc., which are individualised by means of colour tuning, i.e. lamination of an expanding film onto them, or printing of an item of information by means of expanding printing ink, wherein numbers, letters and patterns are applied. In the area to be expanded the hologram has uniform Bragg planes, and overlapping holographic elements cannot therefore be introduced in the hologram region to be individualised. Connecting individual items of information (passport photo) with other holographic (standard) elements in an overlapping fashion in such a way that a higher forgery protection is achieved at the absolute minimum material cost, is not possible or not described.

In WO 02/070275 A2, a colour-tuning film is also used for the retroactive individualisation of holograms, before the individualised hologram is applied on to the document in a further step. In this case the area to be individualised is a holographic mirror, and therefore also has uniform Bragg planes, by means of which for example passport photos are cannot also be connected (in an overlapping fashion) to holographic standard elements.

Finally, in U.S. Pat. No. 4,913,990 A, a liquid solvent-containing expansion medium (thinned with solvent) is proposed, which is applied onto the hologram over its whole area, which means that the hologram swells over its whole area. According to the duration of the action, a certain colour effect is thereby obtained over the whole area. After hardening in UV light, the solvent must be finally removed, however. An expansion only in subregions of the hologram surface, and therefore the possibility of introducing additional items of individual information into the hologram, is not disclosed.

The problem addressed by the invention therefore is to disclose a method, a master and a personal and valuable document of the above-mentioned type, with the aid of which the risk of forgery and manipulation is minimised in a simple and reliable manner.

This problem is solved by means of a method according to the invention according to Claim 1, a master according to Claim 3 and by means of a personal and valuable document according to Claim 12. Advantageous configurations of the invention result from the respective dependent claims to which reference is made.

DETAILED DESCRIPTION OF PREFERRED EMBODIMENTS

Figure 1:
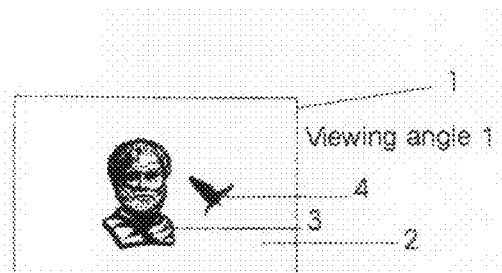
FIG. 1 shows a first viewing angle of a reflection volume hologram with holographic standard elements and a passport photo.
Figure 2:
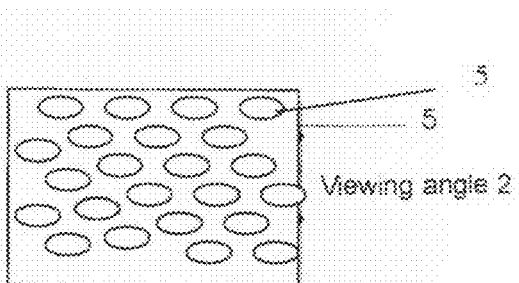
FIG. 2 shows a second viewing angle of the reflection volume hologram of FIG. 1 illustrating a holographic pattern applied to the reflection volume hologram.
Figure 3:
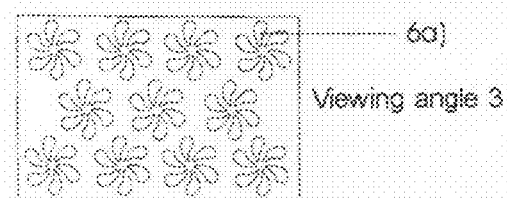
FIG. 3 shows a third viewing angle of the reflection volume hologram of FIG. 1 illustrating a defined color change.
Figure 4:
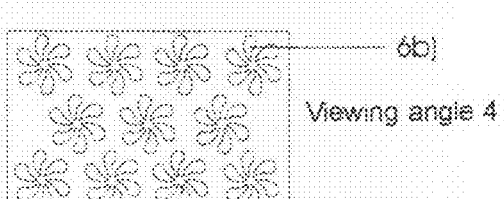
FIG. 4 shows a fourth viewing angle of the reflection volume hologram of FIG. 1 illustrating another defined color change.

According to the invention a volume hologram overlay 1 is created, which when applied on personal and valuable documents, contributes to an increase in forgery protection, wherein it possesses variable items of information 2, 3, 4, 5, 6, that overlap one another optically and are separately visible under different viewing angles, and one of these optical information items represents individual personal data 3, in particular a coloured passport photograph.

In this process a reflection volume hologram 1 (overlay) with holographic standard elements 2, 4, 5, 6 and a passport photo 3 are applied on the document surface, at least one standard element of which is a holographic pattern (5 or 6), which covers all other holographic optical elements in the volume hologram, such as for example a three-dimensional object 4 and the passport photo 3, and an optical connection of all holographic elements to one another therefore results (FIG. 1-4). In this arrangement the visual recognisability of the respective holographic elements 2, 3, 4, 5, 6, in particular the personal data such as for example the passport photo, is preserved and is not adversely affected by the other optically holographic elements.

Figure 5:
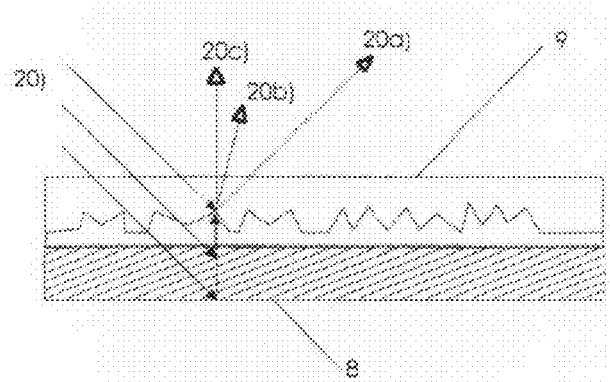
FIG. 5 shows a partially transparent film applied onto another holographic layer with an incident laser light being multiply reflected and refracted.

The problem is solved in particular by the fact that in the manufacture of the volume hologram (1) applied on the personal and valuable document, a photopolymer film 13 is preferably used, which is laminated on a holographic master 7 consisting of multiple holographic layers 8,9 and subsequently all standard optical elements 2, 4, 5, 6 of the master are copied into the film with only one laser light beam. Here, the master 7 consists of at least two holographic layers 8, 9, while at least of one the layers is a partially transparent film (9), advantageously with a film layer thickness of a few μm, which is applied onto the other (lower) layer 8 over its whole area (FIG. 5). This partially transparent film (9) has for example a holographic surface relief 10, preferably a holographic endless pattern 5' and further optically variable elements 6'. For example, this film can be a holographic embossed film with a highly refractive coating of the holographic surface relief, preferably zinc sulphide, titanium oxide or partially transparent, semi-demetallised metal, for example aluminium, with partially demetallised areas. However, it can also be a film with volume holographic patterns and other optical elements. The material of the hologram-carrying master layer 8, on which the partially transparent film 9 is applied, can be for example a silver halide film or photo polymer film, in which holographic elements such as e.g. a three-dimensional object 4', an extensive, homogeneous volume lattice 2' and further optical elements such as position marks and other marks are present. The hologram-carrying master layer 8 can however also be a surface hologram, for example embossed into a metallised film. Owing to the partial transmissivity of the film 9 applied on the layer 8 of the master 7, the holographic elements 5', 6' of the film 9 can be copied into the polymer film by multiple reflection and diffraction of the incident laser light 20, i.e. by a first reflection and diffraction 20a at the relief structures 10 of the partially transparent film 9 and additionally by a second diffraction 20b of the light reflected at the hologram 8 lying underneath it. At the same time, all holographic elements of the layer 8 arranged under the partially transparent film 9 can also be copied into the polymer film by diffraction and reflection of the incident light 20c.

As a result, a holographic copy is obtained in the exposed photopolymer film 13', in which all holographic standard elements overlap one another but can be detected separately at different viewing angles. The multiple diffraction of the surface relief elements 5', 6' during the laser copying causes these elements 5, 6a, 6b in the exposed polymer film 13', observed in reflection, to show a colour-flip effect when a change in the viewing angle occurs.

Figures 6, 7:
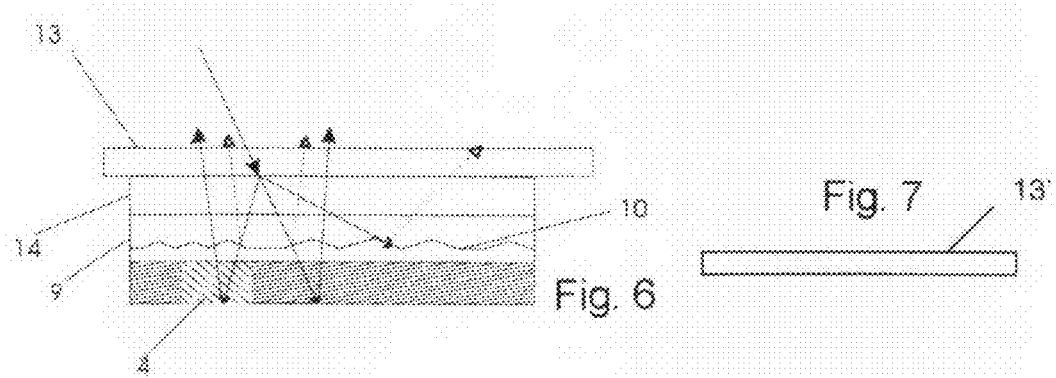
FIG. 6 shows a photopolymer film and a transparent volume holographic film laminated over the film of FIG. 5 and illustrating the relief structures and a holographic element.
FIG. 7 shows an exposed photopolymer film.

A transparent volume hologram film 14 can additionally be laminated onto the partially transparent film 9, the holographic elements of which function as a beam divider in the transmission mode, and therefore divide the incident laser copying beam into multiple beams, which strike the underlying layers 8, 9 at different angles and are diffracted back in different ways (FIG. 6). This enables the holographic elements 2, 4, 5, 6 copied into the photo polymer films 13 of the layers 8 and 9 with one laser light wavelength to be reconstructed in different colours as desired, if the Bragg conditions are fulfilled.

After a laser copy has taken place, the film 13' is developed in the usual manner by the use of a photopolymer film (FIG. 7), for example fixed with UV light and baked at fairly high temperatures, preferably at 120° C.

Figure 8:
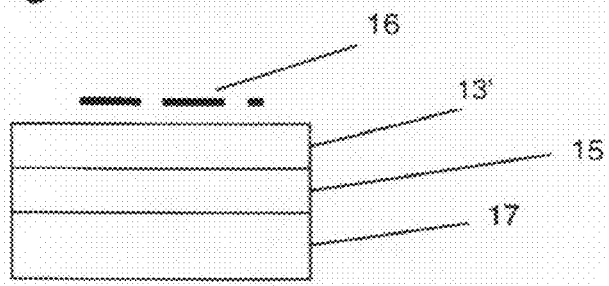
FIG. 8 shows the exposed photopolymer film of FIG. 7 applied to a personal document by a liquid adhesive and an LCD mask generated from data in the document.
Figure 9:
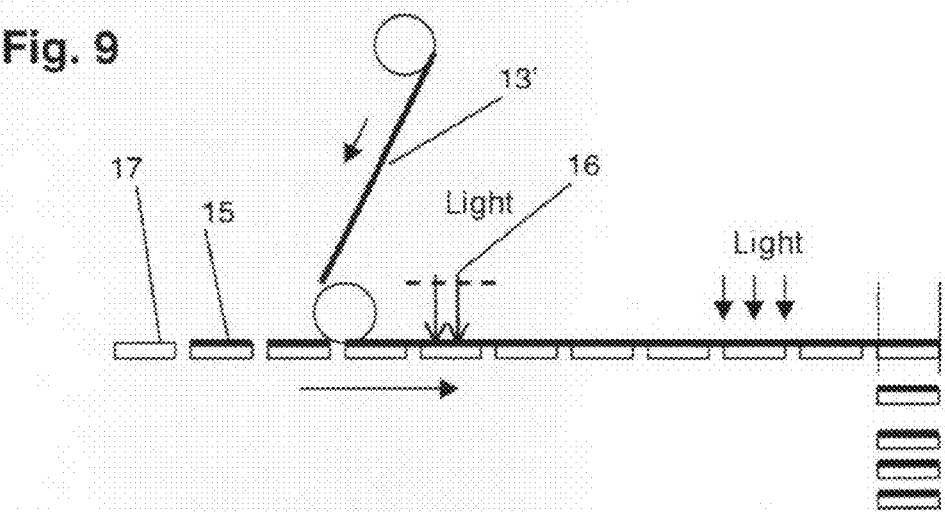
FIG. 9 shows the exposure and curing of the adhesive of FIG. 8.

The holographic passport photo 3 is produced for example during the application of the exposed and developed film 13' on the personal document 17 in the applied film 13', preferably by a liquid, solvent-free, optically cured, monomer-containing adhesive 15 being applied onto the document for gluing the hologram film. The adhesive is first exposed by a mask 16 carrying personal data, and after a few seconds, preferably 10-300 sec, is cured over its whole surface a second time without a mask in order to attain its full adhesive strength (FIG. 8, FIG. 9). The first mask exposure ensures that only those adhesive areas that are located under the light transparent mask areas are cured, while the unexposed monomers of the adhesive have time to penetrate into the polymer film and to expand it, which noticeably manifests itself in a colour change of these holographic areas. The advantage of this individualisation method consists in the fact that the personal data already present, for example in printed form, on the document 17 can be scanned in the application station, and these data can be used for generating the mask, for example an LCD mask 16 or a mask printed on the applied film by the inkjet method, which means that expensive data logistics becomes unnecessary. Simultaneously, the liquid adhesive 15 necessary for permanently bonding the hologram overlay to the personal document is used for the holographic customisation, i.e. a minimum of material usage is achieved. Likewise, it is possible firstly to bond the not yet customised film 13' to the personal document and in a later step to carry out the individualisation of the applied volume hologram overlay during the coating of the hologram surface with protective lacquer, for example by silk-screen application of light-curable monomer-based lacquers, in the same manner.

With this fluid tuning method, one obtains holographic reproducible passport pictures with a surprisingly faithful reproduction of detail, brightness and polychromicity, without the need for multiple lasers of different wavelengths.

As well as the optical connection of all holographic elements of the volume hologram overlay 1 and the resulting higher level of counterfeit-proofing, the advantages of the invention are that only one laser copying beam is used for the production of overlapping holographic elements with different colour reproduction and therefore the equipment costs for a continuous mass production of exposed film are substantially reduced.

Figure 10:
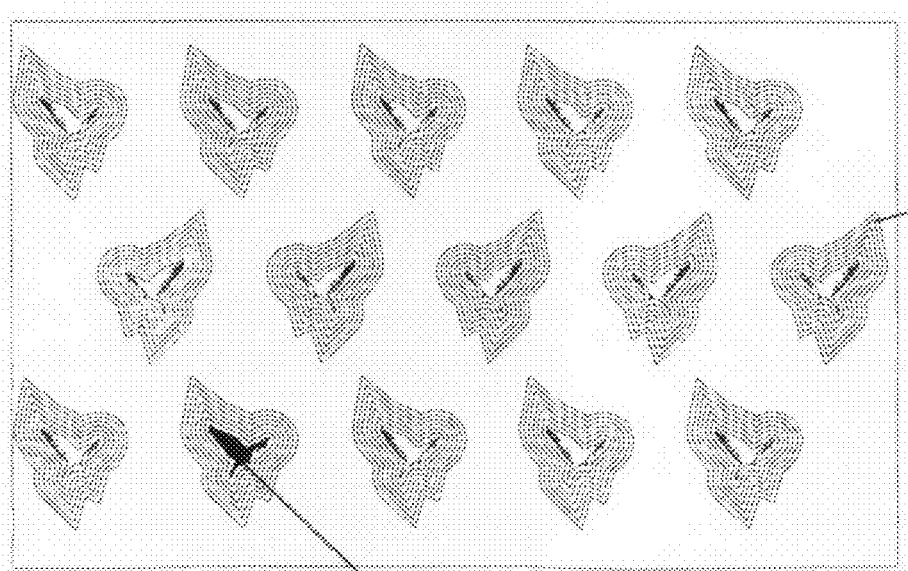
FIG. 10 shows a three-dimensional object with a holographic pattern applied to a reflection volume hologram.

The connection of the various superimposed holographic elements furthermore yields possibilities for new holographic image elements, which arise through combination of the individual components under certain viewing angles, and in addition make the forgery of individual elements more difficult. For example, the three-dimensional object 4 with the holographic patterns 5, 6 can yield a meaningful morphing effect (FIG. 10), given a precise arrangement of these elements with respect to each other in the master.

An improvement in the holographic design in the volume-hologram overlay according to the invention can also be obtained if the holographic elements of the master are combined with opaque areas or contours, for example by imprinting of the uppermost master layer or between the individual master layers, or by arrangement of partially transparent film parts 9 on the lower master layers, these film parts 9 being coated with highly refractive materials of different transparency.

An advantage of the production method according to the invention is that the individual passport photo 3 is not produced until after the laser copying of the standard holographic elements 2, 4, 5, 6 from the master 7 according to the invention, immediately after the application to the document, and therefore any expensive data logistics for assignment of the holograms to the respective customised documents is unnecessary.

By using a multi-layer master with a partially transparent, hologram-carrying uppermost master layer, which is located on further hologram-carrying master layers, overlapping holographic elements, completely and separately visible under different viewing angles can be copied into a volume hologram with only one laser beam.

By means of the production method according to the invention, this copied volume hologram is later customised by utilisation of the colour tuning properties of the light-curable materials used for the application onto personal documents. These holographic individual data, such as passport photo (3), are also separately detectable, without the holographic elements (2, 4, 5, 6) copied from the master, that are visible under other viewing angles, impairing the visibility of the individual data.

The volume hologram overlay (1) obtained by this method, is applied on personal and valuable documents to increase protection against forgery, possesses superimposed optically variable items of information (2, 3, 4, 5, 6), that are separately visible under different viewing angles and give a defined colour change (6a, 6b) under different view angles, wherein at least one of these items of optical information represents individual personal data (3), in particular a passport photograph.

The invention claimed is:

1. A method for producing counterfeit-proof documents with a reflection volume hologram applied thereon, comprising the following steps:
    laminating a photopolymer film onto a holographic master consisting of multiple holographic layers;
    subsequently copying all overlapping optical standard elements of the holographic master into the photopolymer film with only one laser copying beam to form a laser copy,
    removing the photopolymer film from the holographic master after the laser copy is developed or fixed with UV light,
    applying the exposed, developed photopolymer film to the document, and
    generating holographic personal data by a mask exposure before, during or after the application of the exposed, developed photopolymer film to the document,
    wherein the holographic personal data is generated by utilizing color tuning characteristics of a light-curable adhesive used for adhesive bonding to the document, and
    wherein in the step of generating holographic personal data, an optical mask, carrying individual data corresponding to the document, is used and the adhesive is exposed with light, the optical mask being subsequently removed and a further exposure being carried out over a whole surface, 5-300 sec after exposure through the optical mask, in order to completely harden the adhesive between the document and the reflection volume hologram.

2. The method according to claim 1, wherein the holographic master consists of at least two overlapping hologram-carrying layers, of which at least an uppermost layer consists of a partially transparent embossed hologram film with a film layer thickness of a few μm with holographic surface relief elements, said holographic surface relief elements being located over volume holographic elements of lower layers of the holographic master.

3. The method according to claim 2, wherein the film layer is a highly refractive coating.

4. The method according to claim 3, wherein the uppermost layer is composed of multiple volume hologram film and embossed hologram film parts, that are coated with different highly refractive materials.

5. The method according to claim 4, wherein at least one of the embossed hologram film parts of the uppermost layer is a partially demetallized embossed hologram film.

6. The method according to claim 3, wherein the holographic elements of the holographic master are combined with opaque areas or contours by arrangement on the uppermost layer or between the hologram-carrying master layers or by arrangement of partially transparent film parts on the lower layers, wherein these partially transparent film parts are coated with highly refractive master layers of different opacity.

7. The method according to claim 6, wherein the opaque areas are applied using printing technology.

8. The method according to claim 2, wherein at least one of the lower layers is a reflection volume hologram or a surface hologram with three-dimensional objects and two-dimensional elements.

9. The method according to claim 2, wherein the lower layers are partially covered by the uppermost layer.

10. The method according to claim 1, wherein a surface of the holographic master is sealed with a transparent protective layer.

11. The method according to claim 1, wherein the generated holographic personal data is a passport photograph.

12. The method according to claim 1, wherein the personal data already printed on the document is scanned in an application station and said personal data is used for generating the optical mask, said optical mask being in the form of an LCD mask or being applied via an inkjet method.

* * * * *